(12) United States Patent
Christmas et al.

(10) Patent No.: US 11,397,324 B2
(45) Date of Patent: Jul. 26, 2022

(54) HEAD-UP DISPLAY

(71) Applicant: Envisics Ltd, Milton Keynes (GB)

(72) Inventors: Jamieson Christmas, Milton Keynes (GB); Máté Karner, Milton Keynes (GB)

(73) Assignee: ENVISICS LTD, Milton Keynes (GB)

( * ) Notice: Subject to any disclaimer, the term of this patent is extended or adjusted under 35 U.S.C. 154(b) by 230 days.

(21) Appl. No.: 16/517,082

(22) Filed: Jul. 19, 2019

(65) Prior Publication Data
US 2020/0026077 A1   Jan. 23, 2020

(30) Foreign Application Priority Data
Jul. 19, 2018   (GB) ..................................... 1811789

(51) Int. Cl.
 *G02B 27/01*   (2006.01)
 *B60K 35/00*   (2006.01)
 (Continued)

(52) U.S. Cl.
 CPC .......... *G02B 27/0103* (2013.01); *B60K 35/00* (2013.01); *G03H 1/16* (2013.01);
 (Continued)

(58) Field of Classification Search
 CPC ........ G02B 27/0103; G02B 2027/0118; G02B 2027/0107; G02B 27/4272; G02B 5/1876;
 (Continued)

(56) References Cited

U.S. PATENT DOCUMENTS

| | | | | |
|---|---|---|---|---|
| 5,335,099 A | * | 8/1994 | Smith | ...................... G02B 5/32 156/99 |
| 2004/0113866 A1 | | 6/2004 | Aoki et al. | |
| 2007/0229394 A1 | | 10/2007 | Ishikawa et al. | |

(Continued)

FOREIGN PATENT DOCUMENTS

| | | |
|---|---|---|
| CN | 108227193 A | 6/2018 |
| GB | 2496108 A | 5/2013 |

(Continued)

OTHER PUBLICATIONS

UK Combined Search Report and Examination Report, Application No. GB1811789 5, dated Jan. 15, 2019, 5 pages.

*Primary Examiner* — Jade R Chwasz
(74) *Attorney, Agent, or Firm* — McDonnell Boehnen Hulbert & Berghoff LLP

(57) ABSTRACT

There is provided a head-up display for a vehicle. The head-up display has a first housing and a second housing. The first housing comprises a picture generating unit and optical system. The second housing comprises a substantially flat cover glass and a layer. The picture generating unit is arranged to output pictures. The picture generating unit comprises a light source and a spatial light modulator. The light source is arranged to emit light. The spatial light modulator is arranged to receive the light from the light source and spatially-modulate the light in accordance with computer-generated light-modulation patterns displayed on the spatial light modulator to form a holographic reconstruction corresponding to each picture. The optical system is arranged to receive the pictures output by the picture generating unit and relay the pictures using an optical combiner to form a virtual image of each picture. The optical combiner combines light output by the picture generating unit with light from a real-world scene to present combined images to a viewer within an eye-box. The second housing is disposed (Continued)

between the first housing and optical combiner. The substantially flat cover glass is arranged to protect the first housing. The layer is arranged to change the trajectory of light such that any sunlight reflected by the cover glass is deflected away from the eye-box.

18 Claims, 10 Drawing Sheets

(51) Int. Cl.
*G03H 1/16* (2006.01)
*G03H 1/22* (2006.01)

(52) U.S. Cl.
CPC ... *G03H 1/2294* (2013.01); *B60K 2370/1529* (2019.05); *B60K 2370/166* (2019.05); *B60K 2370/167* (2019.05); *B60K 2370/29* (2019.05); *B60K 2370/31* (2019.05); *B60K 2370/37* (2019.05); *G02B 2027/0118* (2013.01); *G03H 2260/00* (2013.01)

(58) Field of Classification Search
CPC ............ G02B 5/1809; G02B 2027/012; G02B 27/0101; G02B 27/0149; G02B 2027/0174; G02B 5/10; G02B 27/01; G02B 5/32; B60K 35/00; B60K 2370/1529; B60K 2370/167; B60K 2370/31; B60K 2370/166; B60K 2370/29; B60K 2370/37; B60K 2370/152; B60K 2370/334; B60K 2370/165; G03H 1/16; G03H 1/2294; G03H 2260/00; B60R 1/00; B60R 2300/205; B60R 2300/30
USPC .......................................................... 359/13
See application file for complete search history.

(56) References Cited

U.S. PATENT DOCUMENTS

| | | | |
|---|---|---|---|
| 2008/0192358 | A1 | 8/2008 | Watanabe et al. |
| 2009/0268273 | A1* | 10/2009 | Powers ................... B32B 37/18 |
| | | | 359/288 |
| 2012/0224062 | A1* | 9/2012 | Lacoste ................... G02B 27/01 |
| | | | 348/148 |
| 2013/0265622 | A1 | 10/2013 | Christmas et al. |
| 2014/0022526 | A1 | 1/2014 | Van Eijk et al. |
| 2014/0253987 | A1 | 9/2014 | Christmas |
| 2017/0082855 | A1 | 3/2017 | Christmas et al. |
| 2017/0115627 | A1 | 4/2017 | Christmas et al. |
| 2017/0363869 | A1 | 12/2017 | Christmas et al. |
| 2018/0046138 | A1 | 2/2018 | Christmas et al. |
| 2018/0120768 | A1 | 5/2018 | Christmas |
| 2018/0188532 | A1 | 7/2018 | Christmas et al. |
| 2018/0356634 | A1* | 12/2018 | Riebe ..................... B60K 35/00 |
| 2019/0041641 | A1 | 2/2019 | Christmas et al. |
| 2019/0064738 | A1 | 2/2019 | Cole et al. |

FOREIGN PATENT DOCUMENTS

| | | |
|---|---|---|
| GB | 2526275 A | 11/2015 |
| GB | 2554575 A | 4/2018 |
| GB | 2567409 A | 4/2019 |
| GB | 2567410 A | 4/2019 |
| GB | 2569206 A | 6/2019 |
| GB | 2569208 A | 6/2019 |
| JP | S52103230 A | 5/1987 |
| JP | H03200427 A | 9/1991 |
| JP | H09-267661 A | 10/1997 |
| JP | 2004-130892 A | 4/2004 |
| JP | 2007-272061 A | 10/2007 |
| JP | 2015068837 A | 4/2015 |
| JP | 6247884 B2 | 12/2017 |
| WO | 2011/015843 A2 | 2/2011 |
| WO | 2016/204021 A1 | 12/2016 |
| WO | 2018078366 A1 | 5/2018 |
| WO | 2018100394 A1 | 6/2018 |
| WO | 2018100397 A1 | 6/2018 |

* cited by examiner

HEAD-UP DISPLAY

CROSS-REFERENCE TO RELATED APPLICATIONS

This application claims the benefit of priority of United Kingdom Patent Application no. GB 1811789.5, filed Jul. 19, 2018, which is hereby incorporated herein by reference in its entirety.

FIELD

The present disclosure relates to a head-up display or heads-up display. More specifically, the present disclosure relates to the upper housing of a head-up display. Yet more specifically, the present disclosure relates to the cover glass of a head-up display. The present disclosure relates to light shields or glare shields for head-up displays or other systems producing virtual images. The light shields inhibit reflections from incoming light such as sunlight.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram, "CGH", may be calculated by a technique based on a mathematical transformation such as a Fresnel or Fourier transform. These types of holograms may be referred to as Fresnel or Fourier holograms. A Fourier hologram may be considered a Fourier domain representation of the object or a frequency domain representation of the object. A CGH may also be calculated by coherent ray tracing or a point cloud technique, for example.

A CGH may be encoded on a spatial light modulator, "SLM", arranged to modulate the amplitude and/or phase of incident light. Light modulation may be achieved using electrically-addressable liquid crystals, optically-addressable liquid crystals or micro-mirrors, for example.

The SLM may comprise a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The SLM may be reflective meaning that modulated light is output from the SLM in reflection. The SLM may equally be transmissive meaning that modulated light is output from the SLM is transmission.

A holographic projector for imaging may be provided using the described technology. Such projectors have found application in head-up displays, "HUD", and head-mounted displays, "HMD", including near-eye devices, for example. There is disclosed herein an improved HUD.

HUDs producing a distant virtual image usually comprise an optical system to relay a picture from a picture generating unit. Depending upon the implementation, the optics of the optical system may be composed of glass/plastic lenses, mirrors, or a combination of both of these. Sunlight may damage components of the HUD, including the display device, but the present disclosure relates to sunlight reflections from components of the HUD system because such reflections may be detrimental to image quality. The problem of sunlight reflections is particularly prominent in HUD systems and can cause, for example, flares on the windscreen of the vehicle. A sunlight reflection of just a few percent from a glass surface without an anti-reflection coating can be sufficient to dazzle a driver.

There is a limited range of different possible sun positions and the orientation of the HUD in the dashboard can be optimised to reduce this range. It is not necessary to block all sunlight within the range but it is necessary to block sunlight which can reflect onto the windshield. Some reflected sunlight on, for example, the internal roof of the car can be tolerated. However, the problem of sunlight reflection puts significant constraints on the integration of a HUD into a dashboard where space is generally very limited.

A range of solutions to mitigate these solar exposure problems have been tried. For example, shutters or baffles have been employed to prevent sunlight even entering the system. An optical component—usually one of the mirrors of the optical relay system—can be coated to reduce the intensity of the sunlight in the system and, in particular, the intensity of the damaging wavelengths reaching the display device. A known example is the use of a so-called "cold" mirror in the optical relay system. Heat drain layers can be employed on the display device to reduce hop spots and the HUD can be de-collimated to increase the spot size of any focused sunlight within the system.

There is disclosed herein an improved HUD including features reducing the effects of solar exposure without adding significant design complexity or volume to the system.

SUMMARY

Aspects of the present disclosure are defined in the appended independent claims.

In various aspects the present disclosure uses a laser-based system to generate an image for display, more particularly an image generator which generates an image by calculating a hologram for the image, displaying this on an SLM and illuminating the displayed hologram with coherent light. The skilled person will, however, appreciate from the following description that the techniques described are applicable to any type of head-up display, albeit they have particular advantages for automotive HUDs.

The described HUD based on a holographic projector is dynamically reconfigurable. A plurality of displayed holograms may be used to form a corresponding plurality of two-dimensional images at different focal plane depths such that these appear at different distances from the observer's eye. For example, each 2D image may be holographically-encoded with a different lens power. In this way, the HUD is able to display substantially two-dimensional images at different effective distances from the observer's eye. The image planes may have different colours or combinations of colours, by using two different holograms to encode the differently coloured images at different depths, displaying these successively on the SLM and controlling a colour of the light source in synchrony. The ability to display images in different colours and/or at different visual depths is useful since more important imagery (symbology) can be placed in the foreground and/or emphasised using colour.

There is provided in one aspect of the disclosure a head-up display for a vehicle. The head-up display has a first housing and a second housing. The first housing comprises a picture generating unit and optical system. The second housing comprises a substantially flat cover glass and a layer. The picture generating unit is arranged to output pictures. The picture generating unit comprises a light source and a spatial light modulator. The light source is arranged to emit light. The spatial light modulator is arranged to receive the light from the light source and spatially-modulate the light in accordance with computer-generated light-modulation patterns displayed on the spatial light modulator to form a holographic reconstruction corresponding to each picture. The optical system is arranged to receive the pictures output by the picture generating unit and relay (or image) the pictures using an optical combiner to form a virtual image of each picture. The optical combiner combines light output by the picture generating unit with light from a real-world scene so as to present combined images to a viewer within an eye-box. The second housing is disposed between the first housing and optical combiner. The substantially flat cover glass is arranged to protect the first housing. The layer is arranged to change the trajectory of light such that any sunlight reflected by the cover glass is deflected away from the eye-box.

The layer is a substantially planar optical element or part of an element which is arranged to change the trajectory of light such that any sunlight reflected by the cover glass does not directly or indirectly reach the eye-box. The layer may be thin and may, for example, have a thickness less than 10 mm such as less than 5 mm or less than 2 mm. There are two critical light paths which may result in sunlight reflected by the cover glass reaching the eye-box. The first critical light path corresponds to sunlight reflected directly into the eye-box by the cover glass. The word directly is used to indicate that the first critical light path does not comprise any additional or intermediary reflections on its path from the cover glass to the eye-box. The second critical light path corresponds to sunlight indirectly reflected from cover glass to eye-box. More specifically, the second critical light path corresponds to sunlight reflected by the cover glass onto the optical combiner (e.g. windscreen) and then reflected by the optical combiner into the eye-box. The word indirectly is used to indicate that the second critical light path includes an additional or intermediary reflection off the optical combiner on its path from the cover glass to the eye-box. Notably, the second housing comprises a layer arranged to change the trajectory of light such that there is no sunlight on the second critical light path. Specifically, any sunlight which would otherwise have been on the second critical light path is deflected onto a different optical path which does not intersect the eye-box. In other words, the layer ensures that any rays of sunlight reflected by the cover glass and then the optical combiner are directed away from the eye-box. The layer ensures that any sunlight incident on the second housing cannot reflect off the cover glass and optical combiner into the eye-box. The layer may decrease the angle of reflection of sunlight off the cover glass such that any rays of sunlight reflected off the cover glass and then the optical combiner are directed away from the eye-box. In accordance with the present disclosure, rays of sunlight reflected by the cover glass and optical combiner towards the viewer do not intersect the eye-box.

There are at least two very significant advantages associated with replacing a curved cover glass with a (substantially) flat cover glass and layer in accordance with the present disclosure. Firstly, the head-up display consumes less volume in the HUD. Specifically, the volume underneath the cover glass (which is a key metric in the automotive industry) is reduced. Secondly, it is easier to process flat surfaces or dispose layers on flat surfaces. Specifically, a flat cover glass can be processed to have a structured surface layer or a layer can be readily disposed, such as deposited or coated, thereon.

The layer is transmissive to light of the picture incident at a first range of angles and substantially reflective to light of other wavelengths incident at a second range of angles. The provision of a substantially flat cover glass allows the layer to take on additional functionality. The layer may be wavelength-selective and/or angularly-selective. A first (bottom) face of the layer is arranged to receive light of the picture at a well-defined first range of angles. The layer may be designed to be substantially transmissive to light of the picture received at the first range of angles. A second (top) face of the layer is arranged to receive sunlight over a second range of angles. The second range may be larger than the first range. The first range may be a subset of the second range. The layer may be designed to be substantially reflective to other wavelengths received at the second range of angles. The layer may be substantially reflective to infrared light received at the second range of angles. Accordingly, the cover glass may prevent at least a portion of the received sunlight from entering the first housing where it may cause problems such as damage to the mirrors or picture generating unit. By applying an angular selection on the useful angles coming out of the HUD, the projected image can be almost unaffected whereas the incoming sunlight rays can be reflected away from the HUD. For example, a hologram or other diffractive optical element may be readily configured to pass a range of angles for one or more of a set of colours.

The layer may be disposed on the cover glass. For example, the layer may be a coating deposited on the cover glass or a separate component adhered to the layer. Alternatively, the layer may be non-fixedly disposed on the cover glass. The virtual nature of the image allows the layer to be disposed in a plane away from the image plane so that it is not visible.

Alternatively, the layer may be a structured surface layer of the cover glass. Accordingly, the cover glass and layer are an integral structure which may be convenient when constructing the head-up display. In these examples, it may be said that the cover glass has a structured surface layer.

The layer may be at least one selected from the group comprising: a hologram, Fresnel structure, metamaterial or graded-index layer. The hologram may be a fixed recording in a medium. More specifically, the hologram may be a fixed diffractive pattern recorded in a recording medium. A hologram may be advantageous because of the additional functionality that may be inherently included in the diffractive pattern such as wavelength-selectivity and/or angular-selectivity. The hologram may, for example, be a volume hologram. The hologram may be a Fourier transform hologram. In this case, each light-modulation pattern comprises the sum of a computer-generated Fourier-transform hologram of the picture and the software lens function. The hologram may be a Fresnel hologram. In this case, each computer-generated light-modulation pattern comprises a computer-generated Fresnel transform hologram embedding the software lens function. The software lens function may have an optical power of 1 to 20 dioptres such as 1 to 10 dioptres. The software lens function may be a Fresnel lens function such as a binary or multilevel, amplitude or phase Fresnel lens function. Alternatively, the layer may be a Fresnel structure corresponding to a concave surface. A Fresnel structure may be coated to provide wavelength-selectivity and/or angular-selectivity. The graded-index layer may have a refractive index which varies with distance from its centre.

The second housing may further comprise a light trap arranged to partially shield the cover glass from sunlight. That is, the light trap is arranged to block rays of sunlight incident thereon. Accordingly, direct and indirect reflections of sunlight off the cover glass do not reach the eye-box. Advantageously, the inclusion of a light trap with a substantially flat cover glass reduces the demands placed on the layer. In particular, the complexity and therefore thickness of the required layer is reduced. The light trap may be substantially adjoining the cover glass.

The layer may have optical power such as positive optical power. Each computer-generated light-modulation pattern may comprise a computer-generated hologram of the picture and a software lens function. The software lens function may have optical power which compensates for the optical power of the layer. It may be advantageous to reduce the size of the light footprint corresponding to sunlight reflected by the cover glass in order to reduce the amount of deflection required to steer away from the eye-box. However, any optical power imparted to the layer will affect the HUD image. Therefore, a software lens function may be combined, such as added, to the computer-generated hologram in order to compensate for the optical power of the layer. The layer may have positive optical power and the software lens function may have negative optical power. The optical power of the layer may be equal and opposite to the optical power of the software lens function.

Alternatively, a second layer may be included to compensate for the first layer. The second layer may be identical to the first layer such that the first and second layers form parallel layers such as parallel faces of the cover glass. Parallel layers ensure that no optical power is imparted to the HUD image and so no correction of the HUD image is required. In other words, the image of the picture formed by the optical system is not affected by the optical power of the layer. The first layer may be a first Fresnel structure on a first major surface of the cover glass and the second layer may be a second Fresnel structure on the second major surface of the cover glass, wherein the first and second Fresnel structures are equal and parallel.

The optical combiner may be a windscreen or windshield of the vehicle. In which case, there is provided a head-up display system comprising the head-up display and the windscreen of the vehicle. The optical combiner may alternatively be a component of the head-up display.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

Reference is made throughout this disclosure to various types of "selectivity" to light including wavelength selectivity and angular selectivity. The term "selectivity" is used to indicate a component having a response to light which is dependent on at least one parameter—such as wavelength or angle—characterising received light. The term "laser-line" is used to refer to a narrow bandwidth having a centre wavelength and a full-wave half-maximum of less than 30 nm, optionally less than 15 nm, further optionally less than 5 nm.

The term "light of the picture" is used herein to refer to the light which forms the picture and emanates (for example, scattered) from the light receiving surface. In other words, the "light of the picture" is the light forming the picture. The "light of the picture" is imaged by the optical system and windscreen. The "light of the picture" may be monochromatic or polychromatic. The "light of the picture" may be composite colour. For example, the "light of the picture" may comprise red, green and blue light. The "light of the picture" may be polarised.

Reference is made to "coatings" but it is well-known in the art that each coating—e.g. a coating providing wavelength selectivity—may comprises a plurality of layers or individual coatings such as a plurality of dielectric layer or individual dielectric coatings.

The term "hologram" is used to refer to the recording which contains amplitude and/or phase information about the object. The term "holographic reconstruction" is used to refer to the optical reconstruction of the object which is formed by illuminating the hologram.

The term "replay plane" is used herein to refer to the plane in space where the holographic reconstruction is fully formed. The term "replay field" is used herein to refer to the sub-area of the replay plane which con receive spatially-modulated light from the spatial light modulator. The terms "image" and "image region" refer to areas of the replay field illuminated by light forming the holographic reconstruction. In embodiments, the "image" may comprise discrete spots which may be referred to as "image pixels".

The terms "encoding", "writing" or "addressing" are used to describe the process of providing the plurality of pixels of the SLM with a respect plurality of control values which respectively determine the modulation level of each pixel. It may be said that the pixels of the SLM are configured to "display" a light modulation distribution in response to receiving the plurality of control values.

It has been found that a holographic reconstruction of acceptable quality can be formed from a "hologram" containing only phase information related to the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will change the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures.

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration

Figure 1:
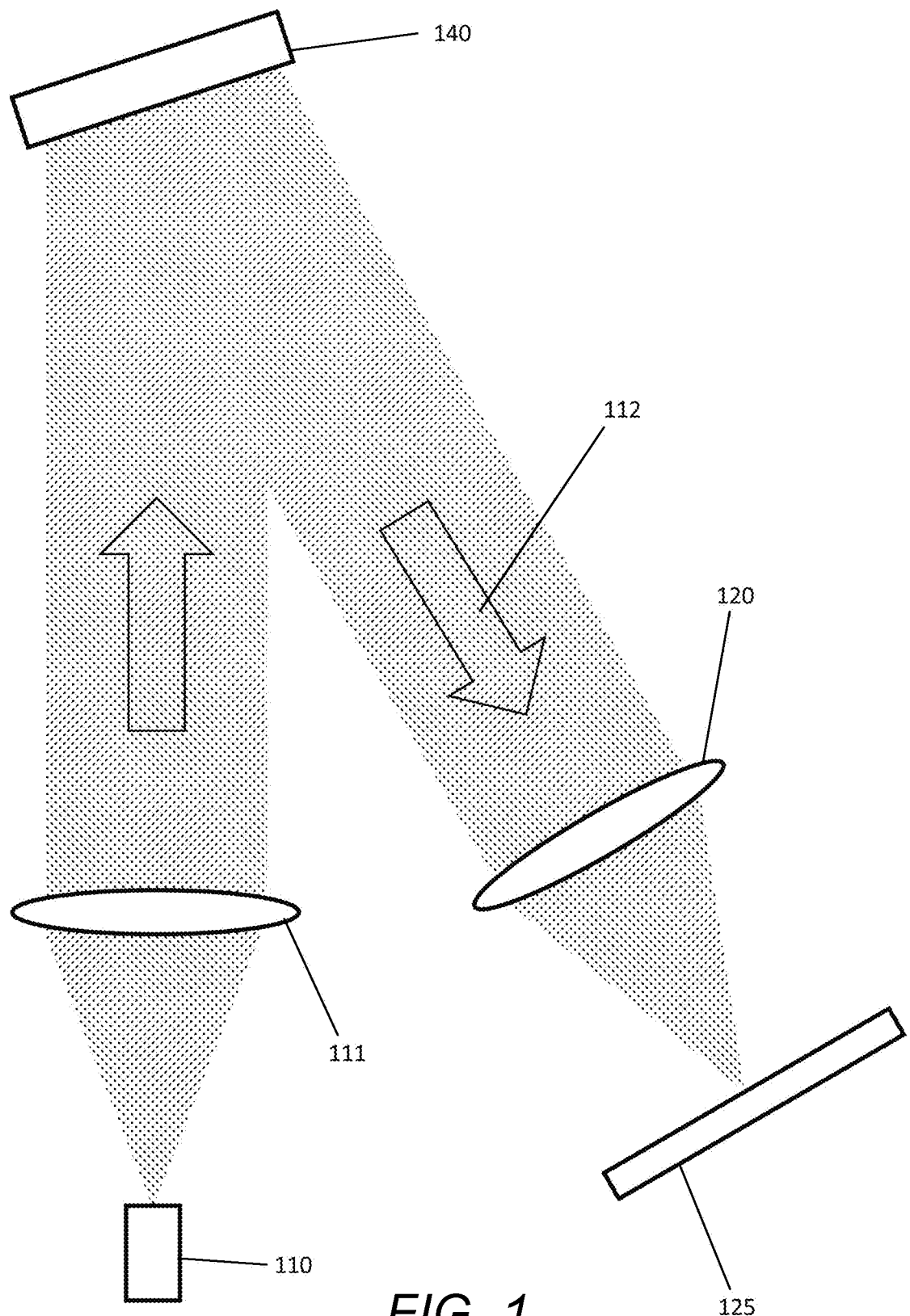
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\psi_A(x, y)$ and $\psi_B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral or frequency) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information $\psi[u, v]$ of the Fourier transform of the data set which gives rise to a known amplitude information $T[x, y]$, wherein the amplitude information $T[x, y]$ is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information $W[u, v]$ is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
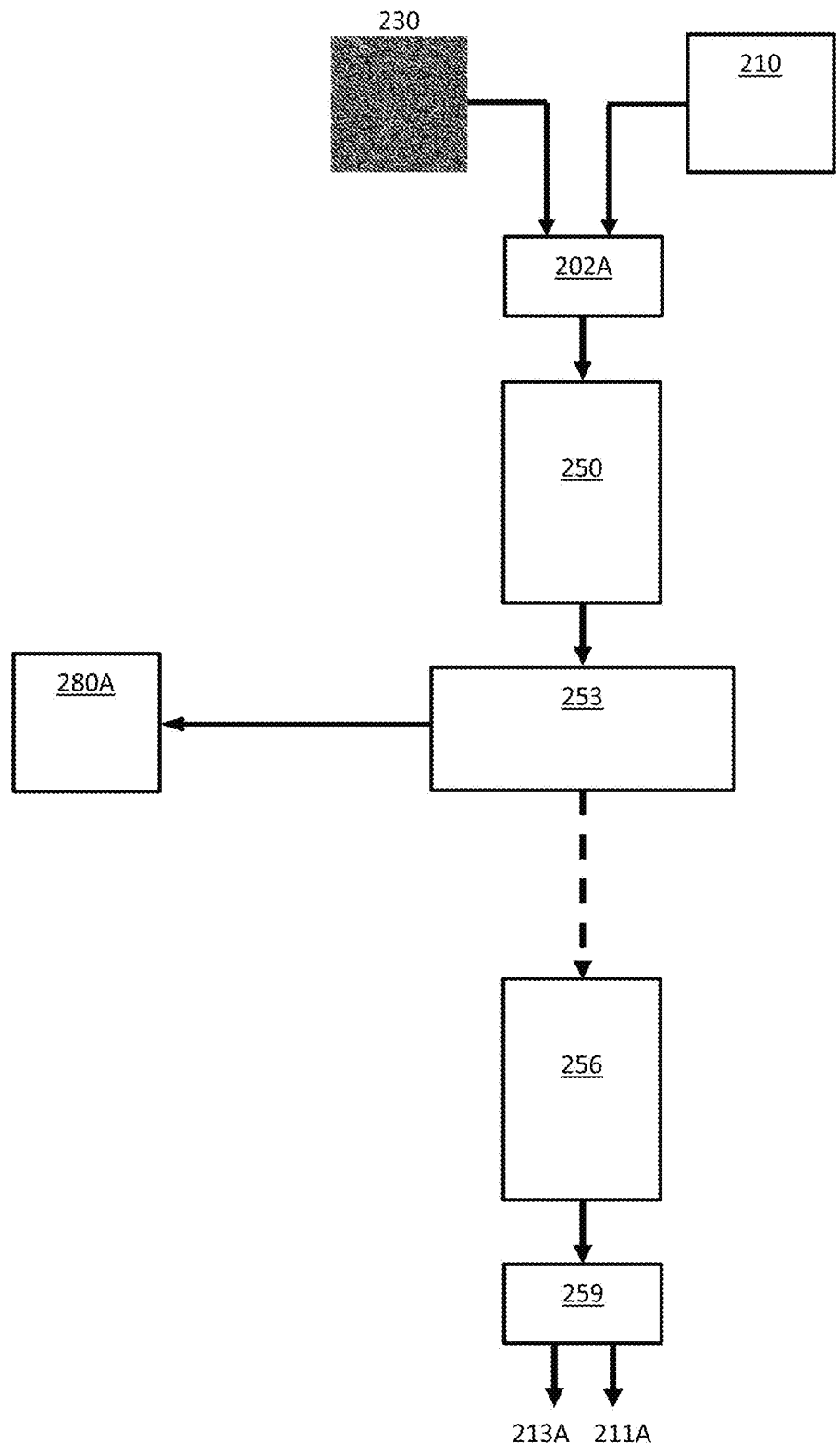
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantises each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 510 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may be performed. However, this comparison step is not essential and in other embodiments, the number of iterations of the algorithm performed is predetermined or preset or user-defined.

Figure 2B:
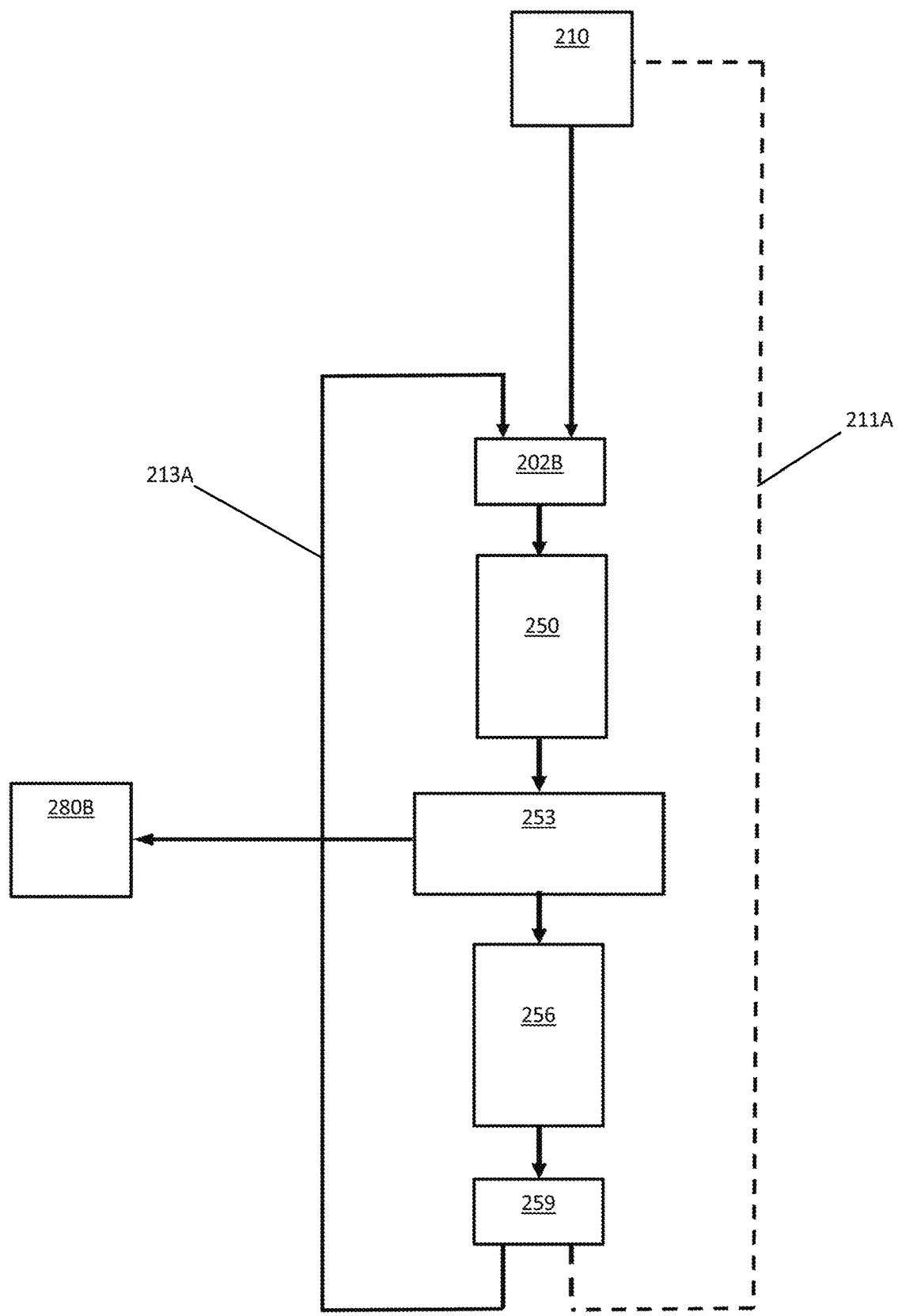
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
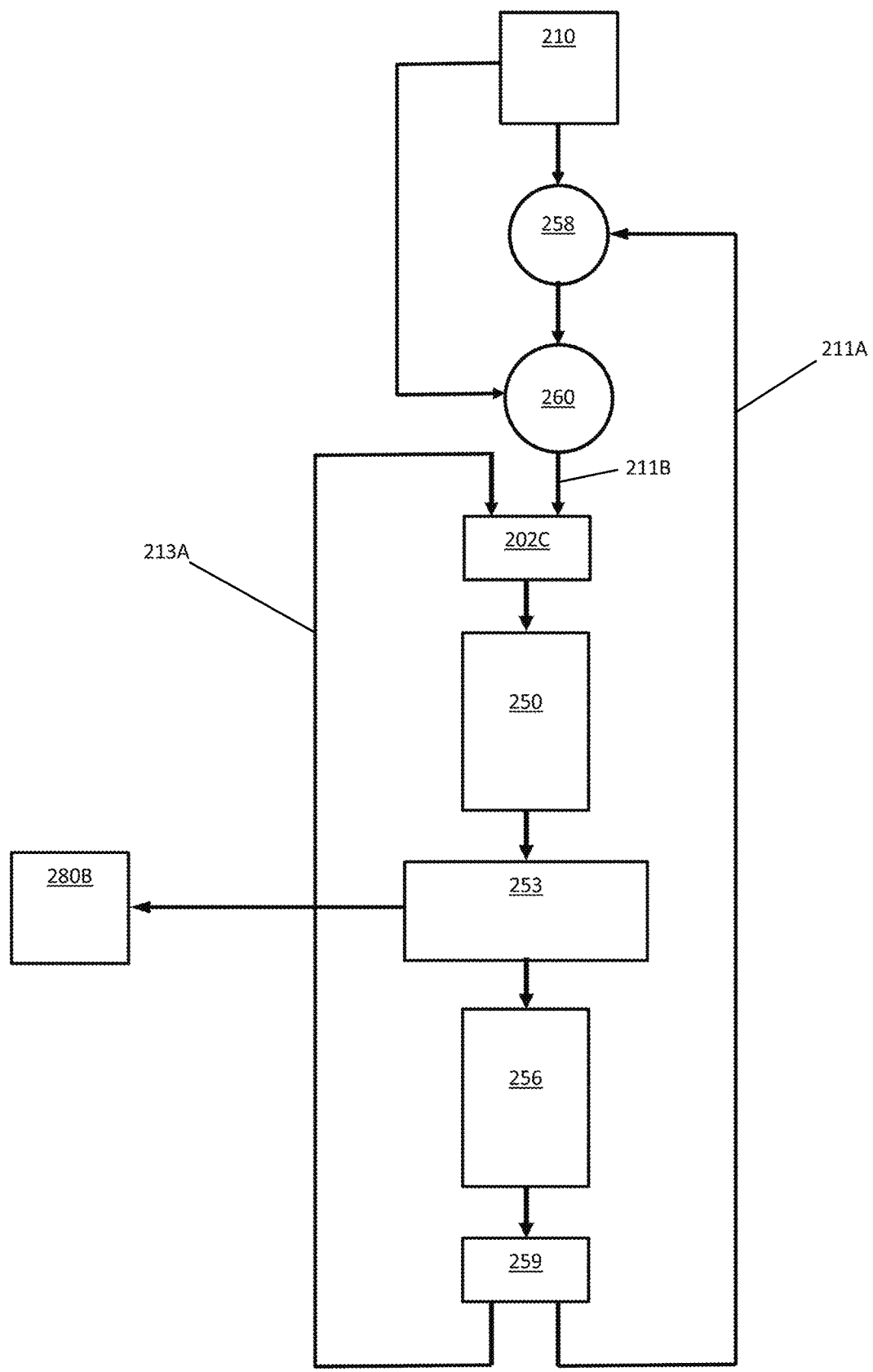
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor α and subtracts the scaled difference from the input image 210. This is expressed mathematically by the following equations, wherein the subscript text and numbers indicate the iteration number:

$$R_{n+1}[x,y]=F'\{\exp(i\psi_n[u,v])\}$$

$$\psi_n[u,v]=\angle F\{\eta\cdot\exp(i\angle R_n[x,y])\}$$

$$\eta=T[x,y]-\alpha(|R_n[x,y]|-T[x,y])$$

where:
F' is the inverse Fourier transform;
F is the forward Fourier transform;
R[x, y] is the complex data set output by the third processing block 256;
T[x, y] is the input or target image;
∠ is the phase component;
ψ is the phase-only hologram 280B;
η is the new distribution of magnitude values 211B; and
α is the gain factor.

The gain factor α may be fixed or variable. In some embodiments, the gain factor α is determined based on the size and rate of the incoming target image data. In some embodiments, the gain factor α is dependent on the iteration number. In some embodiments, the gain factor α is solely function of the iteration number.

The embodiment of FIG. 2C is the same as that of FIG. 2A and FIG. 2B in all other respects. It may be said that the phase-only hologram ψ(u, v) comprises a phase distribution in the frequency or Fourier domain.

In some embodiments, the Fourier transform is performed using the spatial light modulator. Specifically, the hologram data is combined with second data providing optical power. That is, the data written to the spatial light modulation comprises hologram data representing the object and lens data representative of a lens. When displayed on a spatial light modulator and illuminated with light, the lens data emulates a physical lens—that is, it brings light to a focus in the same way as the corresponding physical optic. The lens data therefore provides optical, or focusing, power. In these embodiments, the physical Fourier transform lens 120 of FIG. 1 may be omitted. It is known in the field of computer-generated holography how to calculate data representative of a lens. The data representative of a lens may be referred to as a software lens. For example, a phase-only lens may be formed by calculating the phase delay caused by each point of the lens owing to its refractive index and spatially-variant optical path length. For example, the optical path length at the centre of a convex lens is greater than the optical path length at the edges of the lens. An amplitude-only lens may be formed by a Fresnel zone plate. It is also known in the art of computer-generated holography how to combine data representative of a lens with a hologram so that a Fourier transform of the hologram can be performed without the need for a physical Fourier lens. In some embodiments, lensing data is combined with the hologram by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may be combined in the same way with grating data—that is, data arranged to perform the function of a grating such as beam steering. Again, it is known in the field of computer-generated holography how to calculate such data. For example, a phase-only grating may be formed by modelling the phase delay caused by each point on the surface of a blazed grating. An amplitude-only grating may be simply superimposed with an amplitude-only hologram to provide angular steering of the holographic reconstruction.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and holograms calculated by other techniques such as those based on point cloud methods.

Light Modulation

A spatial light modulator may be used to display the diffractive pattern including the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimetres in width). The pixels are typically approximately microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
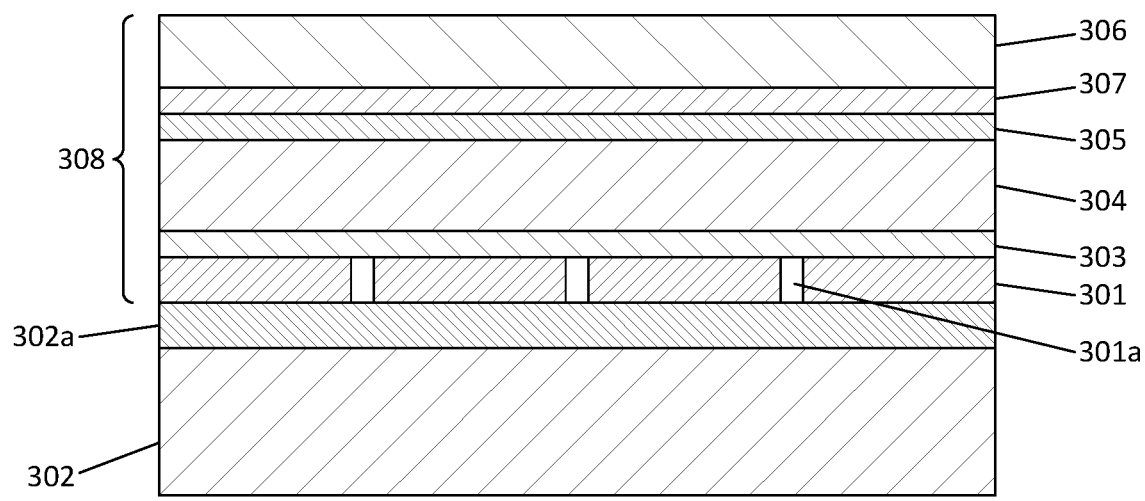
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301a, arranged on the upper surface of the substrate. Each of the electrodes 301 can be addressed via circuitry 302a buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301a. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

Head-Up Display

Figure 4:
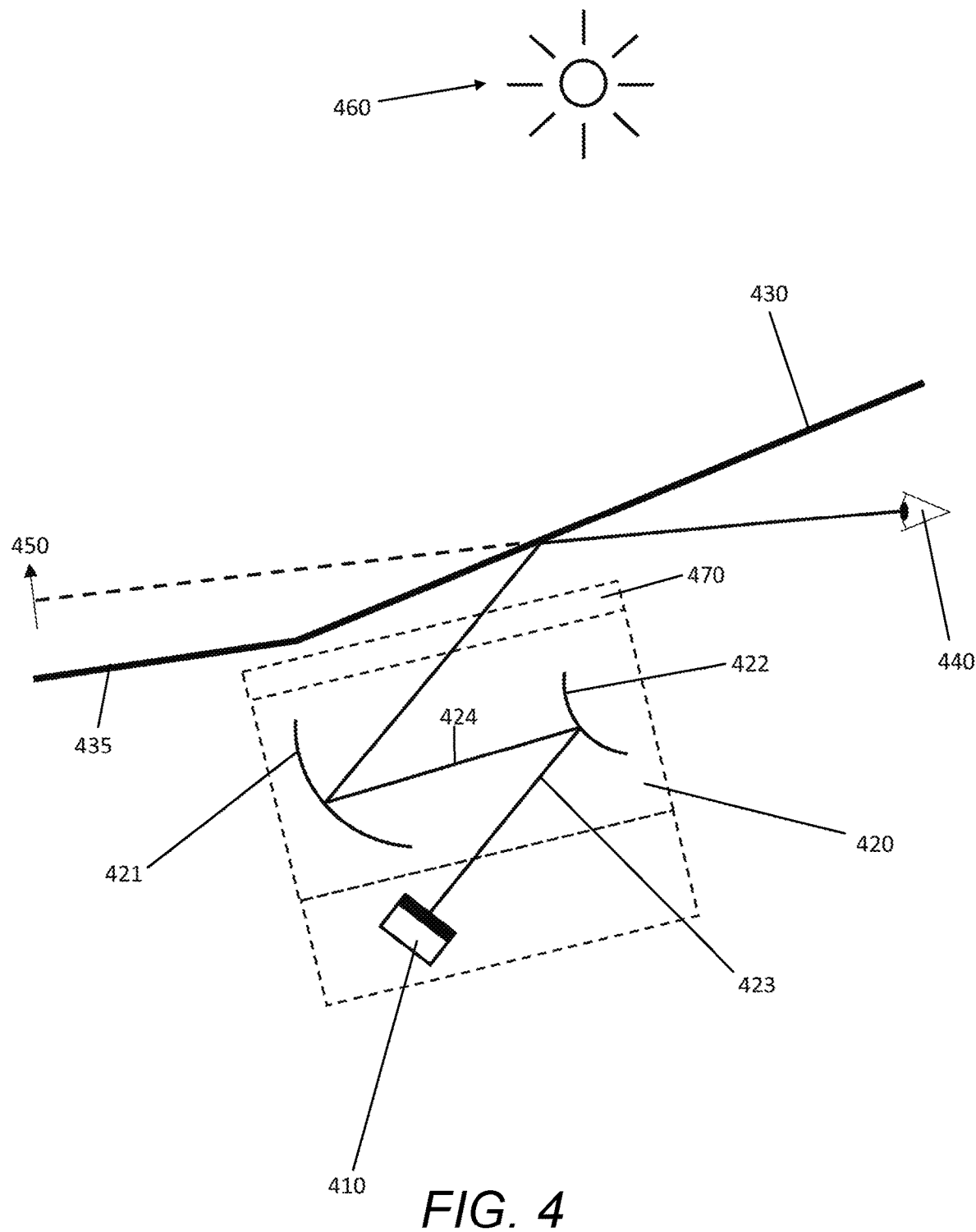
FIG. 4 shows a HUD in a vehicle such as a car.

FIG. 4 shows a HUD in a vehicle such as a car. The windscreen 430 and bonnet (or hood) 435 of the vehicle are shown in FIG. 4. The HUD comprises a picture generating unit, "PGU", 410 and an optical system 420. The optical system 420 shown in FIG. 4 comprises two mirrors by way of example only. The present disclosure is equally applicable to optical systems comprising any number of mirrors including just one mirror.

The PGU 410 comprises a light source, a light receiving surface and a processor (or computer) arranged to computer-control the image content of the picture. The PGU 410 is arranged to generate a picture, or sequence of pictures, on the light receiving surface. The light receiving surface may be a screen or diffuser. In some embodiments, the light receiving surface is plastic (that is, made of plastic).

The optical system 420 comprises an input port, an output port, a first mirror 421 and a second mirror 422. The first mirror 421 and second mirror 422 are arranged to guide light from the input port of the optical system to the output port of the optical system. More specifically, the second mirror 422 is arranged to receive light of the picture from the PGU 410 and the first mirror 421 is arranged to receive light of the picture from the second mirror 422. The first mirror 421 is further arranged to reflect the received light of the picture to the output port. The optical path from the input port to the output port therefore comprises a first optical path 423 (or first optical path component) from the input to the second mirror 422 and a second optical path 424 (or second optical path component) from the second mirror 422 to the first mirror 421. There is, of course, a third optical path (or optical path component) from the first mirror to the output port but that is not assigned a reference numeral in FIG. 4.

The optical configuration shown in FIG. 4 may be referred to as a "z-fold" configuration owing to the shape of the optical path.

The HUD is configured and positioned within the vehicle such that light of the picture from the output port of the optical system 420 is incident upon the windscreen 430 and at least partially reflected by the windscreen 430 to the user 440 of the HUD. Accordingly, in some embodiments, the optical system is arranged to form the virtual image of each picture in the windscreen by reflecting spatially-modulated light off the windscreen. The user 440 of the HUD (for example, the driver of the car) sees a virtual image 450 of the picture in the windscreen 430. Accordingly, in embodiments, the optical system is arranged to form a virtual image of each picture on a windscreen of the vehicle. The virtual image 450 is formed a distance down the bonnet 435 of the car. For example, the virtual image may be 1 to 2.5 metres from the user 440. The output port of the optical system 420 is aligned with an aperture in the dashboard of the car such that light of the picture is directed by the optical system 420 and windscreen 430 to the user 440. In this configuration, the windscreen 430 functions as an optical combiner. In some embodiments, the optical system is arranged to form a virtual image of each picture on an additional optical combiner which is included in the system. The windscreen 430, or additional optical combiner if included, combines light from the real-world scene with light of the picture. It may therefore be understood that the HUD may provide augmented reality including a virtual image of the picture. For example, the augmented reality information may include navigation information or information related to the speed of the automotive vehicle. In some embodiments, the light forming the picture is output by incident upon the windscreen at Brewster's angle (also known as the polarising angle) or within 5 degrees of Brewster's angle such as within 2 degrees of Brewster's angle.

In some embodiments, the first mirror and second mirror are arranged to fold the optical path from the input to the output in order to increase the optical path length without overly increasing the physical size of the HUD.

The picture formed on the light receiving surface of the PGU 410 may only be a few centimetres in width and height. The first mirror 421 and second mirror 422 therefore, collectively or individually, provide magnification. That is, the first mirror and/or second mirror may have optical power (that is, dioptric or focusing power). The user 440 therefore sees a magnified virtual image 450 of the picture formed by the PGU. The first mirror 421 and second mirror 422 may also correct for optical distortions such as those caused by the windscreen 430 which typically has a complex curved shape. The folded optical path and optical power in the mirrors together allow for suitable magnification of the virtual image of the picture.

The PGU 410 of the present disclosure comprises a holographic projector and a light receiving surface such as a screen or diffuser. In accordance with the disclosure above, the holographic projector comprises a light source, a spatial light modulator and a hologram processor. The spatial light modulator is arranged to spatially-modulate light in accordance with holograms represented on the spatial light modulator. The hologram processor is arranged to provide the computer-generated holograms. In some embodiments, the hologram processor selects a computer-generated hologram for output from a repository (e.g. memory) comprising a plurality of computer-generated holograms. In other embodiments, the hologram processor calculates and outputs the computer-generated holograms in real-time. In some embodiments, each picture formed by the PGU 410 is a holographic reconstruction on the light receiving surface. That is, in some embodiments, each picture is formed by interference of the spatially-modulated light at the light receiving surface.

Figure 5:
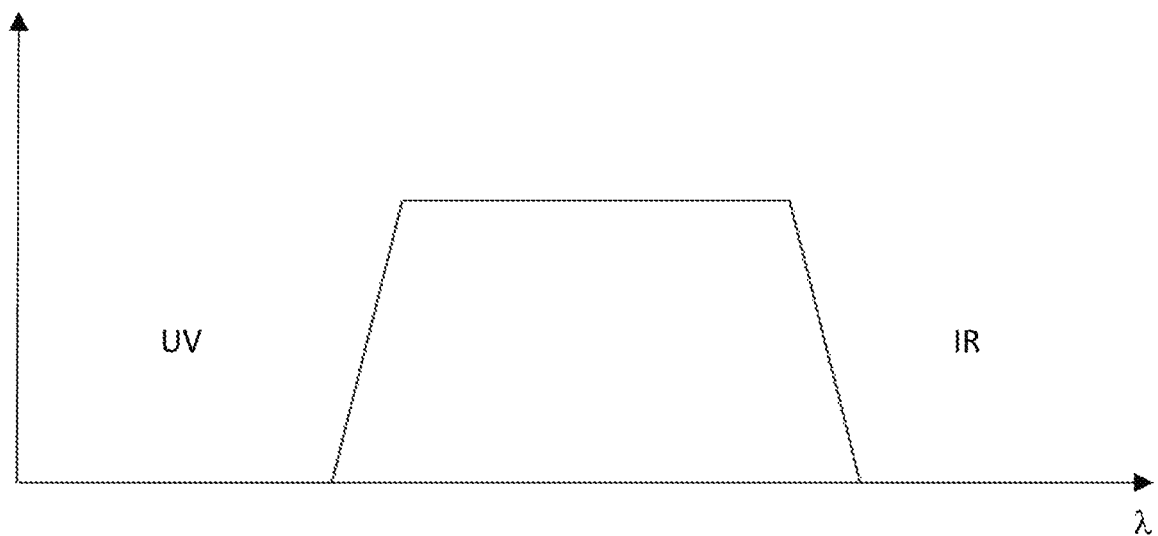
FIG. 5 illustrates the optical performance of an example "hot/cold mirror"

The dashboard of the vehicle comprises an aperture because the HUD requires an optical path (preferably, an unobstructed optical path) to the windscreen. However, this optical path between the windscreen and HUD equally allows ambient light, such as sunlight 460, to get into the HUD. This causes various problems as described herein. A HUD therefore typically further comprises an upper housing 470 containing solar countermeasures described further below with reference to FIGS. 6 and 7. In examples, the first mirror is also a cold mirror arranged to filter out infrared radiation. The cold mirror may reflect visible light but transmit infrared, "IR", light. In other examples, the first mirror 421 is a so-called hot/cold mirror which at least partially filters out IR and ultraviolet, "UV", light. FIG. 5 shows the reflectance (y-axis) of an example hot/cold mirror as a function of optical wavelength (x-axis).

Figure 6A:
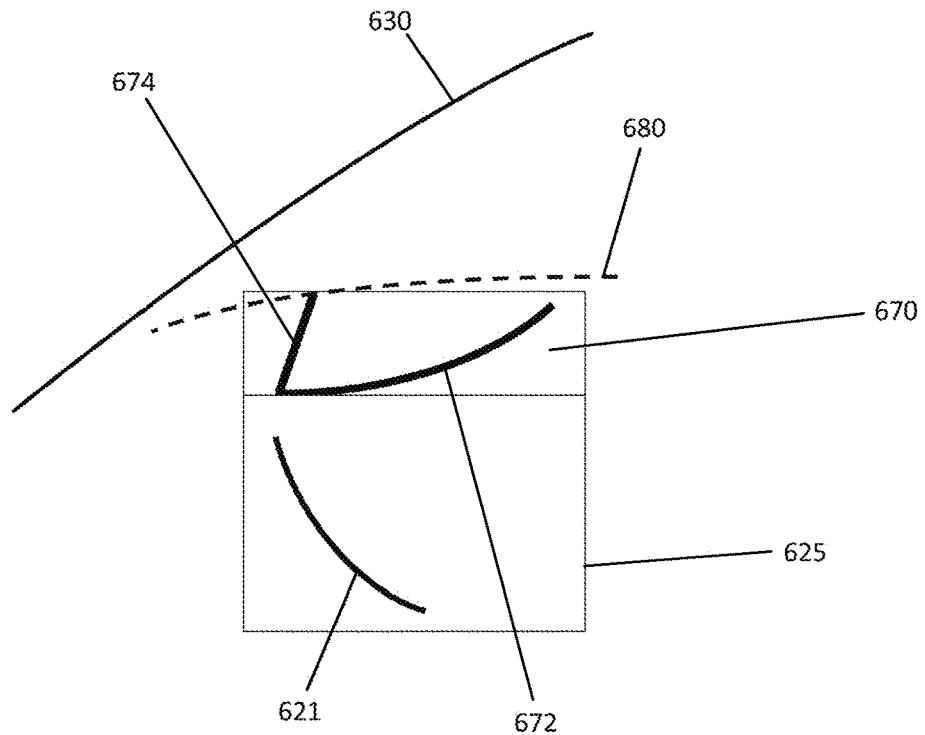
FIGS. 6A and 6B illustrate a curved cover glass and two critical light paths for sunlight reflected by the cover glass.

FIG. 6A shows a lower (or first) housing 625 comprising the optical system of a head-up display in a vehicle having a windscreen 630 and dashboard 680. The lower housing comprises at least a first mirror 621 of the optical system and other components not shown for simplicity in the drawing. The head-up display includes an upper (or second) housing 670 containing solar countermeasures. Specifically, the upper housing 670 comprises a light trap 674 and a cover glass 672. The cover glass 672 is reflective and curved such as generally parabolic or elliptical. The function of the solar countermeasures may be better understood with reference to FIG. 6B.

Figure 6B:
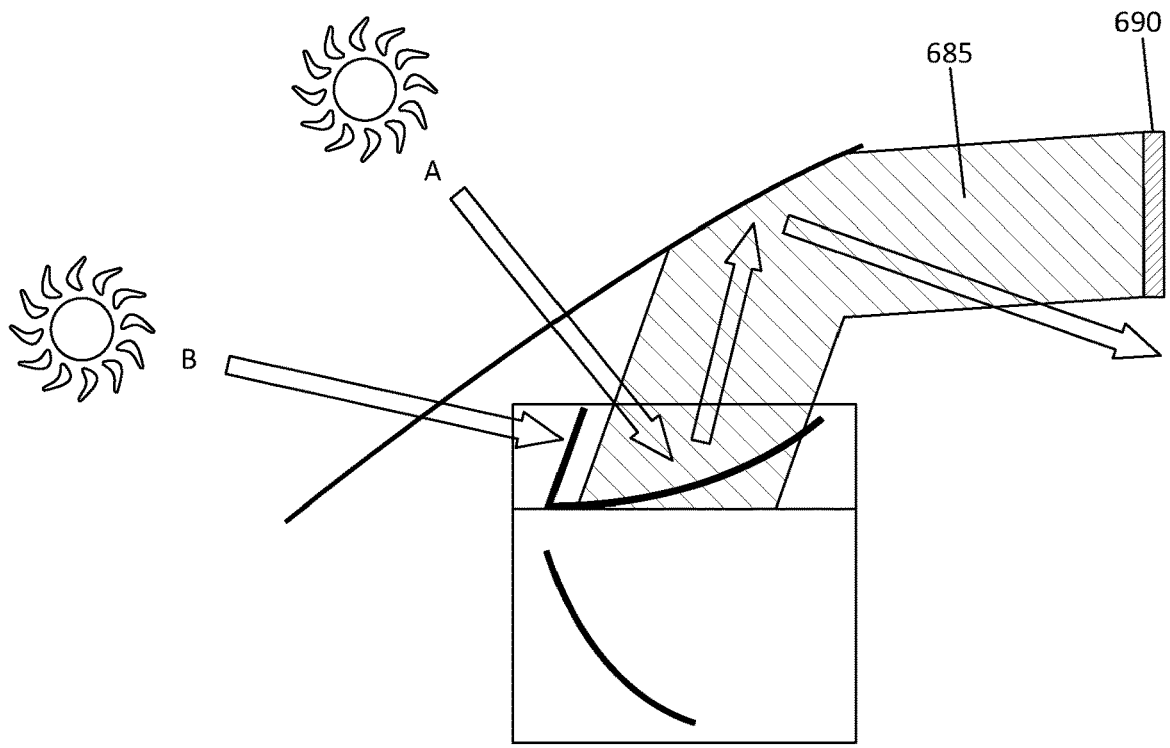

FIG. 6B shows the so-called eye-box 690 of the head-up display which is the area of space in which the HUD image (virtual image of the picture) may be viewed. If the viewer's eyes are inside the eye-box, the HUD image will be seen. If the viewer's eyes are outside the eye-box, the HUD image will not be seen. The eye-box 690 is sufficient to accommodate tall and short drivers and allow for normal head movement during driving. FIG. 6B shows a volume 685 containing light rays from the lower housing 625 which form the HUD image.

FIG. 6B also shows how the cover glass 672 is curved such that rays of sunlight, such as sunlight ray A, which pass through the windscreen 630 and reach the cover glass 672 do not reflect off the inner surface of the windscreen and into the driver's eyes. Conventionally, the curvature of the cover glass 672 is such that rays of sunlight, such as sunlight ray A, which are reflected off the cover glass 672 and inner surface of the windscreen are directed downwardly onto the driver's chest area as shown in FIG. 6B. It will be understood that although the reflection off the inner surface of the windscreen may be less than 4% (perhaps even only 0.1% if the windscreen is coated), the peak intensity of sunlight makes these reflections problematic in a HUD. Curving the cover glass 672 adds manufacturing complexity and adds volume to the HUD.

The second component of the upper housing is the light trap 674. The light trap 674 is a physical baffle which shields other components of the HUD from some sunlight. In particular, the light trap 674 generally shields from relatively shallow sunlight (that is, sunlight when the sun is relatively low in the sky such near sunset—for example, sunlight ray B) such that it does not reach the cover glass 672.

Figure 7:
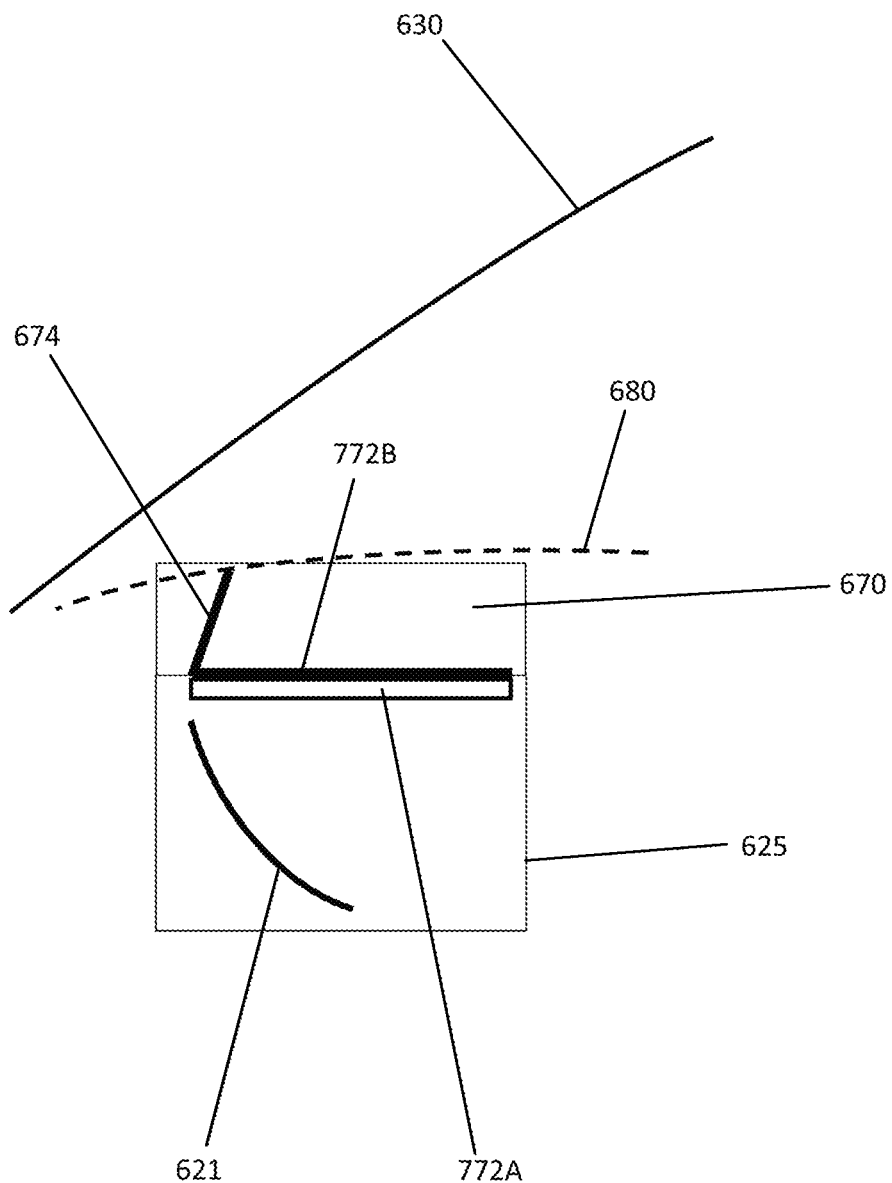
FIG. 7 shows an embodiment of the present disclosure including a substantially flat cover glass.

FIG. 7 shows an embodiment of the present disclosure in which the cover glass 772A is substantially flat and there is provided a layer 772B which mimics or replicates the curvature of the curved cover glass. That is, the layer 772B provides the equivalent or the same optical functionality of a curved cover glass such as cover glass 672. The layer 772B may be a flat layer disposed on the cover glass 772A or the layer 772B may be a structured surface layer of the cover glass 772A. The structured surface layer of the cover glass 772A may be formed by processing the surface of the cover glass 772A by, for example, machining, pressing, etching or the like. The cover glass 772A and layer 772B may be integral. The cover glass 772A and layer 772B may have been integrally-formed. In these embodiments, it may be said that the cover glass 772A comprises the layer 772B. Alternatively, the layer 772B may not be integral with the cover glass 772A. The layer 772B may be an independently-formed component that has been attached or fixed to the cover glass 772A. In some embodiments, the layer 772B is a coating on the cover glass 772A. The structured surface layer may include features which are not visible to the naked eye. In some embodiments, the layer 772B provides the functionality of the curvature of a curved cover glass by diffracting or refracting received sunlight. That is, the layer 772B is a diffractive, reflective and/or refractive structure. Although cover glass 672 is referred to as glass, it will be understood that it is not necessarily made of glass. More generally, the cover glass 772A is an optical window that is substantially transparent at optical wavelengths.

The layer 772B is primarily arranged to mitigate the problems causable by the reflection of sunlight having a relatively large elevation angle. Such sunlight may reflect off the cover glass, then reflect off the inside surface of the optical combiner and into the eye-box. The elevation angle is the angle the rays make with the horizon. The layer 772B is generally arranged to deal with first rays of sunlight having an elevation angle greater than a threshold elevation angle. More specifically, the layer 772B is arranged to deflect any rays of sunlight reflected off the cover glass 772A and then the optical combiner 630 such that they do not intersect the eye-box. The light trap 674 is generally arranged to mitigate the problems causable by rays of sunlight having a relatively low elevation angle. More specifically, the light trap 674 is generally arranged to deal with second rays of sunlight having an elevation angle less than the threshold elevation angle. The light trap 674 shields the cover glass 772A from sunlight as much as it can without blocking volume 685 containing light rays from the lower housing 625 which form the HUD image. It can be preferential to maximise the size of the light trap 674 in order to minimise the demands placed on the layer 772B to mitigate the effects of reflected sunlight. In some embodiments, the light trap 674 and cover glass 672 are substantially adjoining or connected or form a substantially continuous structure. The size, shape and position of the light trap 674 and cover glass 672 are largely determined parameters of the vehicle, dashboard and eye-box. Ray tracing is used to determine the critical parameters of the cover glass 672, light trap 674 and layer 772B on a use case by use case basis. In practice, significant demands are placed on the second housing and it has to deal with the reflections of sunlight incident over a large range of angles. The layer 772B ensures that there are no direct or indirect ray paths for sunlight reflected by the cover glass 772A into the eye-box.

In some embodiments, the layer 772B is a hologram. The hologram may be a fixed holographic recording in a medium which should not be confused with the dynamically reconfigurable holograms displayed on the spatial light modulator of the picture generating unit. The holographic recording medium may be a photopolymer or silver halide emulsion. The silver halide emulsion may be bleached for phase holography. The holographic recording medium may also be a dichromated gelatin. The hologram may be a thin or thick hologram. Alternatively, the hologram may be a switchable Bragg grating or switchable volume holographic element. It is known in the art how to computer-generate or optically-record a hologram which changes the trajectory of light or steers a beam of light in a predetermined way. In some embodiments, the hologram comprises a beam steering function, as described above, such as a grating function displayable on the spatial light modulator to steer light. It is well-established in computer-generated holography how the parameters of the grating, such as period and orientation, may be chosen, e.g. calculated or selected, to determine the magnitude and direction of the deflection. The beam steering function may be a regular grating, Ronchi grating or prism. More specifically, the beam steering function is a distribution of light-modulation levels corresponding to a regular grating, Ronchi grating or prism. That is, the hologram is a beam steering function providing the optical functionality of a regular grating, Ronchi grating or prism.

In some embodiments, the layer 772B is a Fresnel structure corresponding to a curved surface. In some embodiments, the Fresnel structure corresponds to a concave surface. The Fresnel structure may be a Fresnel diffractive pattern. It is known in the art how to form a Fresnel structure corresponding to (that is, providing the optical functionality of) a curved surface. The Fresnel structure is calculated based on the required magnitude of deflection. The Fresnel structure is orientated to provide the required direction of deflection. The Fresnel structure may be a structured surface pattern formed on a plastic cover glass by, for example, moulding and pressing.

In some embodiments, the layer 772B is a metamaterial comprising a sub-wavelength periodic array of sub-wavelength dielectric structures and sub-wavelength metallic structures. It is known in the art how to design a metamaterial which changes in the trajectory of light in a predetermined way.

In some embodiments, the layer 772B is a graded-index layer in which the refractive index varies with distance from its centre. The person skilled in the art of optical design would know how to design a graded-index layer to deflect light by a predetermined amount.

In some embodiments, the computer-generated hologram displayed on the spatial light modulator is combined with a software lens which compensates for the optical effect of the layer 772B. In some embodiments, the layer 772B has optical power, such as positive or negative optical power, and the software lens has optical power to compensate the optical power of the layer 772B.

In some embodiments, there are provided two layers. For example, the two layers may be the two surface layers of the cover glass. More specifically, in some embodiments, the cover glass is substantially planar and has first and second primary surfaces (which are the two surfaces/faces having the largest surface area) each comprising a layer arranged to deflect light as described herein. In some embodiments, the two layers comprise a Fresnel structure corresponding to the same concave surface. In some embodiments, the cover glass 772A comprises a first structured surface layer arranged to receive sunlight and a second structured surface layer arranged to receive light of the picture. The first structured surface layer and second structured surface layer are Fresnel structures corresponding to the same concave surface. The cover glass 772A is therefore parallel-faced.

This is advantages for two reasons: firstly, both surfaces of the cover glass 772A may reflect sunlight towards the eye-box 690 so it is advantageous if both surfaces have optical power; and secondly, the two Fresnel surfaces are equal and opposite such that the cover glass 772A does not affect the HUD image because the layer is thin enough that the first Fresnel surface is cancelled out by the second Fresnel surface. In other words, the cover glass 772A does not have optical power because it is thin and parallel-faced.

Figure 8A:
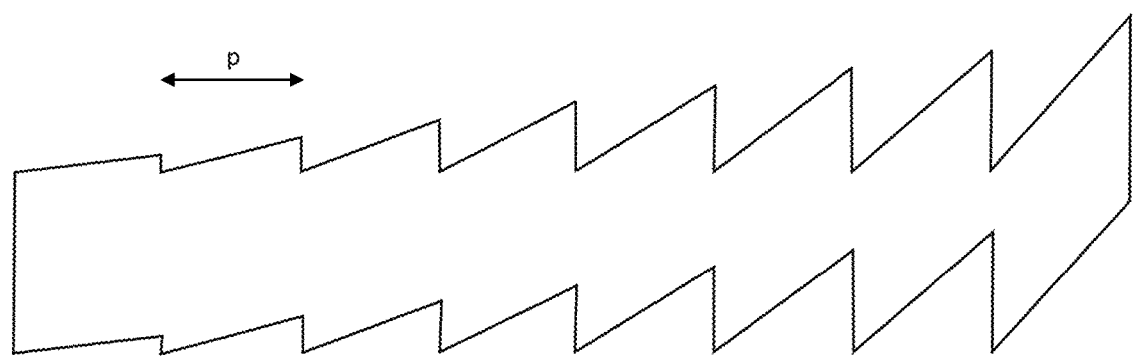
FIGS. 8A and 8B show example Fresnel structures in accordance with some embodiments.
Figure 8B:
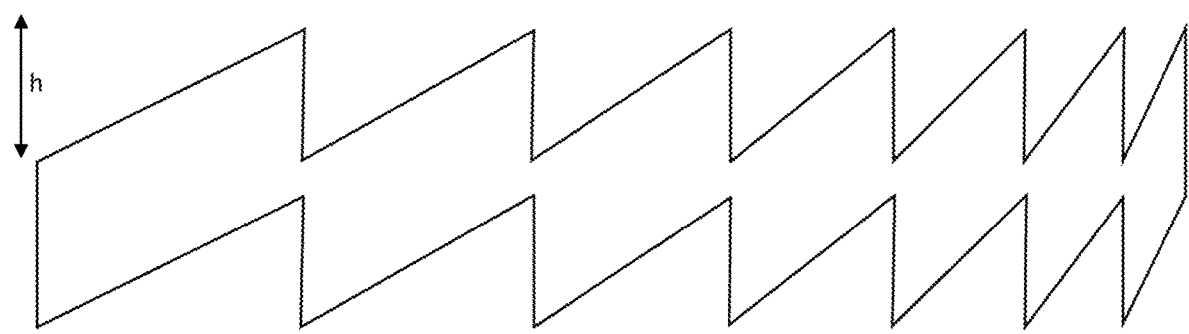

FIG. 8A shows a first example Fresnel structure comprising two structured surfaces in accordance with some embodiments. The periodicity, p, of each Fresnel surface (top and bottom) shown in FIG. 8A is constant but the slope of the light receiving surface increases from left to right to mimic a curved surface. FIG. 8B shows a second example Fresnel structure comprising two structured surfaces in accordance with some embodiments. The height, h, of each Fresnel surface (top and bottom) shown in FIG. 8B is constant but the slope of the light receiving surface also increases from left to right to mimic a curved surface. In FIGS. 8A and 8B, sunlight is received from above and each structured surface therefore corresponds to a concave surface. The periodicity of each Fresnel surface may be of the order of 0.1 mm. The height of each Fresnel surface may be of the order of 0.01 mm. It is known in the art how to make such structures and the person skilled in the art will understand how to design the periodicity and height of each Fresnel structure to achieve the required effective curvature. The Fresnel structures shown in FIGS. 8A and 8B may be a layer 772B disposed on the cover glass 772A. However, in a preferred configuration, the cover glass 772A is processed to have the two structured surface layers shown. Notably, the provision of closely-spaced, parallel faces ensures the HUD image is not distorted by the structures provided.

Alternatively, or additionally, the layer 772B may be designed such that it is transparent to wavelengths of the light of picture and reflective to light of other optical wavelengths. It will be understood by the person skilled in the art that this can be achieved by providing "notches", such as transmission notches in an otherwise reflective structure, at the wavelengths of the light of the picture. In particular, in some embodiments, the light of picture comprises red, green and/or blue laser light. In these embodiments, it may be said that the layer 772B comprises laser-line selective filtering. That is, the layer 772B is arranged to provide laser-line selective filtering. It may alternatively be said that the layer 772B comprises a laser-line selective filter. Furthermore, the filter may be designed for the angles at which light of the picture will be received. That is, the laser-line selective filtering comprises transmitting laser-line wavelengths received at first range of angles of incidence. The laser-line selective filtering may comprise reflecting or absorbing laser-line wavelengths received at angles outside the first range. In some embodiments, the laser-line selective filtering may comprise reflecting light of other wavelengths (non laser-line wavelengths) received at a second range of angles, wherein the second range of angles corresponds to the range of possible sunlight angles. In some embodiments, the layer further comprises wavelength-selective and angularly-selective filtering. In some embodiments, the layer comprises a volume hologram incorporating the functionality described herein.

The laser-line selective filter is selective at the wavelength of the light source of the picture generating unit. More specifically, the laser-line selective filter is arranged to allow the propagation of light at the wavelength of the light forming the picture through the cover glass but filter out other optical wavelengths including other visible wavelengths. The optical performance of the laser-line selective filter differs from that of, for example, a cold mirror, hot mirror or hot/cold mirror in that the laser-line selective filter additionally filters out some visible wavelengths. The optical performance of the laser-line selective filter further differs from that of a cold mirror or hot/cold mirror by virtue of the narrow bandwidth over which the laser-line selective filter is transmissive. In some embodiments, the laser-line selective filter is transmissive within a wavelength band centred at a centre wavelength and having a full-wave half-maximum of less than 30 nm, such as less than 15 nm or less than 5 nm.

In some embodiments, the picture generating unit comprises a light source arranged to emit light at a first wavelength. The picture generating unit further comprises a spatial light modulator arranged to receive the light from the light source and output spatially-modulated light in accordance with a computer-generated hologram represented on the spatial light modulator to form a corresponding picture on the light receiving surface. In some embodiments, the layer 772B comprises a laser-line selective filter which is selective at the first wavelength. In some embodiments, the laser-line selective component is a coating on other components of the layer or a coating on the cover glass.

In some embodiments, the laser-line selective filter is substantially transmissive at the first wavelength and substantially non-transmissive, such as reflective, at other optical wavelengths. In some embodiments, the laser-line selective filter is substantially transmissive at the first wavelength, a second wavelength and a third wavelength, and substantially non-transmissive such as reflective at other optical wavelengths, wherein the first, second and third wavelengths are wavelengths of light of the picture.

In some embodiments, the HUD provides a multicolour display. In these embodiments, the picture generating unit further comprises a second light source, a second spatial light modulator, a third light source and a third spatial light modulator. The second light source is arranged to emit light at the second wavelength. The second spatial light modulator is arranged to receive the light at the second wavelength from the second light source and output second spatially-modulated light in accordance with a second computer-generated hologram represented on the second spatial light modulator to form a corresponding second picture on the light receiving surface. The third light source is arranged to emit light at the third wavelength. The third spatial light modulator is arranged to receive the light at the third wavelength from the third light source and output third spatially-modulated light in accordance with a third computer-generated hologram represented on the third spatial light modulator to form a corresponding third picture on the light receiving surface.

In some embodiments, the HUD provides a composite colour display. In these embodiments, the picture, second picture and third picture are substantially coincident and the optical system is arranged to image the picture, first picture and second picture. In some embodiments, the optical system is arranged to simultaneously image the picture, first picture and second picture. It may be said that the light of the picture comprises light of a plurality of wavelengths.

In some embodiments, the HUD provides an RGB colour display wherein the first wavelength is 425+/−20 nm, the second wavelength is 525+/−20 nm and the third wavelength is 640+/−20 nm.

In some embodiments, each light source emits substantially monochromatic light, optionally, wherein each light source is a laser. It may be understood that these embodiments provide synergy with the laser-line selective filtering. In some embodiments, the centre wavelength of the light emitted by each laser coincides with a centre wavelength of a laser-line selective filter.

In some embodiments, the layer 772B further comprises polarisation-selective filtering. That is, the layer 772B is arranged to provide polarisation-selective filtering. It may alternatively be said that the layer 772B comprises a polarisation-selective filter. The polarisation-selective filter may be included instead of the laser-line selective filter or as well as the laser-line selective filter. In some embodiments, the polarisation-selective filter is a wire-grid polariser.

The polarisation-selective filter is arranged to allow the propagation of the light polarised in a first direction, including the light of the picture (that is, the light forming the picture), through the optical system. The polarisation-selective filter is arranged to filter out (i.e. remove from the optical system) light polarised in a second direction or filter out the component of unpolarised light which is polarised in the second direction, wherein the first direction is perpendicular to the second direction. For example, the polarisation-selective filter 801 may absorb light polarised in the second direction. Again, in some embodiments, the light forming the picture which is output by the first housing will be incident upon the windscreen at Brewster's angle (also known as the polarisation angle) or within 5 degrees of Brewster's angle such as within 2 degrees of Brewster's angle. It may be understood that, in these embodiments, the windscreen reflects substantially all light polarised in the first direction. In other words, the first direction is such that substantially all the (polarised) light forming the picture from the optical system is reflected by the windscreen. The word substantially is used to reflect that in examples in which the light is incident upon the windscreen at an angle near the Brewster's angle, perfect polarisation separation may not be achieved. In some embodiments, the light is incident upon the windscreen at an angle of 55 to 75 degrees such as 60 to 70 degrees. In these embodiments, the light source is arranged to emit light polarised in a first direction and, optionally, at a first wavelength. In some embodiments, the polarisation-selective component is a coating on other components of the layer or a coating on the cover glass.

In some embodiments, the polarisation-selective filter is substantially transmissive to light polarised in the first direction and substantially non-transmissive to light polarised in a second direction, wherein the first direction is perpendicular to the second direction.

The polarisation-selective filter may be incorporated in displays providing a monochromatic picture or displays providing a polychromatic picture as described above. It will be understood that the optical performance of the polarisation-selective filter may be wavelength dependent. For example, the polarisation-selective filter may only be polarisation-selective within a range of wavelengths or within plural ranges of wavelengths.

In embodiments, the light of the picture comprises light of a plurality of wavelengths, as described above. The polarisation-selective filter is polarisation selective at the plurality of wavelengths. In some embodiments, the polarisation-selective filter is polarisation selective at the first wavelength, second wavelength and third wavelength. It may be understood that, like the laser-line selective filter, the polarisation-selective filter may have a centre wavelength or wavelengths at which filtering is optimised. The centre wavelength or wavelengths may include a bandwidth in the manner described above.

It may be understood from the embodiments described that the layer may provide light-selective filter. The light-selective filtering may comprise a laser-line selective filtering and/or polarisation-selective filtering.

Some embodiments use the windscreen as the optical combiner but the optical combiner may alternatively be a pop-up optical combiner in front of the windscreen such as on the dashboard.

Additional Features

Embodiments refer to an electrically-activated LCOS spatial light modulator by way of example only. The teachings of the present disclosure may equally be implemented on any spatial light modulator capable of displaying a computer-generated hologram in accordance with the present disclosure such as any electrically-activated SLMs, optically-activated SLM, digital micromirror device or microelectromechanical device, for example.

The invention claimed is:

1. A head-up display for a vehicle, the head-up display having a first housing comprising:
    a picture generating unit arranged to output pictures, wherein the picture generating unit comprises: a light source arranged to emit light; and a spatial light modulator arranged to receive the light from the light source and spatially-modulate the light in accordance with computer-generated light-modulation patterns displayed on the spatial light modulator to form a holographic reconstruction corresponding to each picture; and
    an optical system arranged to receive the pictures output by the picture generating unit and relay the pictures using an optical combiner to form a virtual image of each picture, wherein the optical combiner combines light output by the picture generating unit with light from a real-world scene to present combined images to a viewer within an eye-box,
    wherein the head-up display further comprises a second housing disposed between the first housing and optical combiner, wherein the second housing comprises:
    a substantially flat cover glass arranged to protect the first housing and a layer arranged to change the trajectory of light such that any sunlight reflected by the cover glass is deflected away from the eye-box, wherein the layer is arranged to provide the optical functionality of a curved cover glass.

2. A head-up display as claimed in claim 1 wherein the layer is transmissive to light of the picture incident at a first range of angles and substantially reflective to light of other wavelengths incident at a second range of angles.

3. A head-up display as claimed in claim 1 wherein the layer is disposed on the cover glass.

4. A head-up display as claimed in claim 1 wherein the layer is a structured surface layer of the cover glass.

5. A head-up display as claimed in claim 1 wherein the layer comprises a hologram.

6. A head-up display as claimed in claim 1 wherein the layer comprises a Fresnel structure corresponding to a concave surface.

7. A head-up display as claimed in claim 1 wherein the layer comprises a metamaterial.

8. A head-up display as claimed in claim 1 wherein the layer comprises a graded-index layer in which the refractive index varies with distance from its centre.

9. A head-up display as claimed in claim 1 wherein the second housing further comprises a light trap arranged to partially shield the cover glass from sunlight.

10. A head-up display as claimed in claim 1 wherein the layer has optical power and each computer-generated light-modulation pattern comprises a computer-generated hologram of the picture and a software lens function having optical power which compensates for the optical power of the layer.

11. A head-up display as claimed in claim 1 wherein the second housing comprises a second layer identical to the first layer such that the first and second layers form parallel faces.

12. A head-up display as claimed in claim 1 wherein the optical combiner is the windscreen of a vehicle.

13. A head-up display as claimed in claim 1 wherein the layer is arranged to provide the optical functionality of a curved cover glass that is a concave cover glass.

14. A display system comprising a head-up display and an optical combiner configured to present images to a viewer within an eye-box, the head-up display comprising
 a first housing comprising:
  a picture generating unit arranged to output pictures, wherein the picture generating unit comprises: a light source arranged to emit light; and a spatial light modulator arranged to receive the light from the light source and spatially-modulate the light in accordance with computer-generated light-modulation patterns displayed on the spatial light modulator to form a holographic reconstruction corresponding to each picture; and
  an optical system arranged to receive the pictures output by the picture generating unit and relay the pictures using the optical combiner to form a virtual image of each picture, wherein the optical combiner combines light output by the picture generating unit with light from a real-world scene to present combined images to the viewer within the eye-box; and
 a second housing disposed between the first housing and optical combiner, the second housing comprising:
  a substantially flat cover glass arranged to protect the first housing and a layer arranged to change the trajectory of light such that any sunlight reflected by the cover glass is deflected away from the eye-box, wherein the layer is arranged to provide the optical functionality of a curved cover glass.

15. A display system as claimed in claim 14 wherein the optical combiner is the windscreen of a vehicle.

16. A vehicle comprising a display system as claimed in claim 15.

17. A method for displaying information to an occupant of a vehicle, the method comprising:
 within a first housing, generating light bearing a series of pictures, wherein each picture is generated by receiving light at a spatial light modulator and spatially-modulating the light in accordance with a computer-generated light-modulation pattern corresponding to the picture to form a holographic reconstruction corresponding to the picture;
 passing the light bearing the series of pictures through a substantially flat cover glass arranged to protect the first housing and a layer arranged to change the trajectory of light; and
 relaying the light bearing the series of pictures using an optical combiner to form a virtual image of each picture by combining light bearing the generated picture with light from a real-world scene to present combined images to a viewer within an eye-box,
 wherein the layer deflects any sunlight reflected by the cover glass away from the eye-box, and wherein the layer is arranged to provide the optical functionality of a curved cover glass.

18. A method as claimed in claim 17 wherein the layer is arranged to provide the optical functionality of a curved cover glass that is a concave cover glass.

* * * * *